(12) United States Patent
Eckhart

(10) Patent No.: US 7,890,135 B2
(45) Date of Patent: Feb. 15, 2011

(54) SYSTEM AND METHOD FOR PROTECTING DATA BASED ON GEOGRAPHIC PRESENCE OF A RESTRICTED DEVICE

(75) Inventor: Colin J. Eckhart, Raleigh, NC (US)

(73) Assignee: Sony Ericsson Mobile Communication AB, Lund (SE)

( * ) Notice: Subject to any disclaimer, the term of this patent is extended or adjusted under 35 U.S.C. 154(b) by 655 days.

(21) Appl. No.: 11/684,022

(22) Filed: Mar. 9, 2007

(65) Prior Publication Data

US 2008/0218196 A1 Sep. 11, 2008

(51) Int. Cl.
*H04M 1/00* (2006.01)
*H04M 11/00* (2006.01)
*H04M 1/66* (2006.01)
*H04M 1/68* (2006.01)

(52) U.S. Cl. ............... 455/552.1; 455/410; 455/411
(58) Field of Classification Search ............ 455/411, 455/41.1, 41.2, 552.1, 410
See application file for complete search history.

(56) References Cited

U.S. PATENT DOCUMENTS

2004/0042413 A1* 3/2004 Kawamura et al. ......... 370/252
2004/0236952 A1 11/2004 Girouard et al.
2005/0054290 A1* 3/2005 Logan et al. ............... 455/41.2
2006/0009154 A1* 1/2006 Tung ....................... 455/41.2

FOREIGN PATENT DOCUMENTS

EP 1701483 9/2006

OTHER PUBLICATIONS

International Preliminary Report on Patentability from corresponding International Application No. PCT/US07/77969.

* cited by examiner

*Primary Examiner*—Nick Corsaro
*Assistant Examiner*—Manpreet S Matharu
(74) *Attorney, Agent, or Firm*—Renner, Otto, Boisselle & Sklar, LLP

(57) ABSTRACT

A method of protecting data stored by an electronic device includes determining an identity of a restricted device. Also determined is the identity of restricted data associated with the restricted device, the restricted data being one or more items of data stored by the electronic device. Data protection for the restricted data to limit access to the restricted data by the restricted device in invoked when geographic presence of the restricted device with respect to the electronic device is detected.

18 Claims, 3 Drawing Sheets

SYSTEM AND METHOD FOR PROTECTING DATA BASED ON GEOGRAPHIC PRESENCE OF A RESTRICTED DEVICE

TECHNICAL FIELD OF THE INVENTION

The present invention relates generally to the management of data in an electronic device and, more particularly, to a system and method for protecting data based on the physical presence of an electronic device.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. To name a few examples, many electronic devices have cameras, text messaging capability, Internet browsing capability, electronic mail capability, video playback capability, audio playback capability, and image display capability.

Sometimes, a user of an electronic device, such as a mobile telephone, desires to protect certain material from being accessed, shared, viewed or heard by others. It is possible to encrypt data files, but this requires affirmative action by the user to encrypt the data and leads to a need to decrypt the data when the user or other authorized users wish to access the data. Also, if the data is in use (e.g., displayed on a display or in the process of audible output), a person who is in the presence of the user's electronic device may see or overhear the related content.

In still other situations, when a portable electronic device becomes located in the vicinity of the user's device, a wireless interface between the devices may be established. Depending on file sharing settings and/or synchronizing settings, one device may be able access data (e.g., stored files) from the other device and/or view directory listings, playlists and similar data that is maintained by the other device.

SUMMARY

To improve the protection of data from access by nearby electronic device and/or to minimize content from being overheard or seen by others, there is a need in the art for a system and method for protecting data based on the geographic presence of other electronic devices. The user may configure restriction rules to identify certain devices that are associated with persons from which the user may desire to limit access to certain content. Along with the restricted devices, the user may identify certain data as restricted data. When a restricted device is in the presence of the user's device, protocols may be invoked to cloak the restricted data from access by the restricted device. Also, limits to the display and/or audible output of content associated with the restricted data may be invoked when a restricted device is in the presence of the user's device.

According to one aspect of the invention, a method of protecting data stored by an electronic device includes determining an identity of a restricted device; determining restricted data associated with the restricted device, the restricted data being one or more items of data stored by the electronic device; detecting geographic presence of the restricted device with respect to the electronic device; and invoking data protection for the restricted data to limit access to the restricted data by the restricted device.

According to one embodiment of the method, the detecting of the geographic presence of the restricted device is accomplished by receiving a device identifier from the restricted device over a communication link established directly between the restricted device and the electronic device.

According to one embodiment of the method, the detecting of the geographic presence of the restricted device is accomplished by identifying a location of the electronic device, identifying a location of the restricted device and comparing the locations.

According to one embodiment of the method, the restricted data is a file, folder, database or directory stored by the electronic device.

According to one embodiment of the method, the restricted data is at least one of a buddy list, a playlist or a contact list maintained by the electronic device.

According to one embodiment of the method, protecting the restricted data includes manipulating a data directory to hide the existence of the restricted data as part of the data stored by the electronic device.

According to one embodiment of the method, protecting the restricted data includes disabling an ability to access the restricted data using the restricted device.

According to one embodiment of the method, protecting the restricted data includes disabling an ability to access the restricted data using the electronic device.

According to one embodiment, the method further includes warning a user of the electronic device of the geographic presence of the restricted device.

According to one embodiment, the method further includes determining if the restricted data is in use and, if so, discontinuing use of the restricted data.

According to one embodiment of the method, the electronic device is a mobile telephone.

According to another aspect of the invention, an electronic device includes a memory that stores data, some of the data being specified by a user of the electronic device as restricted data for an associated restricted device; and a control circuit that is configured to protect the restricted data by limiting access to the restricted data by the restricted device when the restricted device is detected to be in a geographic presence with respect to the electronic device.

According to one embodiment, the electronic device further includes a wireless communication link device for establishing a communication link between the electronic device and one or more other electronic devices, and wherein detection of the geographic presence of the restricted device is accomplished by receiving a device identifier from the restricted device over a communication link established directly between the restricted device and the electronic device using the communication link device.

According to one embodiment of the electronic device, detection of the geographic presence of the restricted device is accomplished by identifying a location of the electronic device, identifying a location of the restricted device and comparing the locations.

According to one embodiment of the electronic device, the restricted data is protected by manipulating a data directory to hide the existence of the restricted data as part of the data stored by the electronic device.

According to one embodiment of the electronic device, the restricted data is protected by disabling an ability to access the restricted data using the restricted device.

According to one embodiment of the electronic device, the restricted data is protected by disabling an ability to access the restricted data using the electronic device.

According to one embodiment of the electronic device, the control circuit controls the electronic device to warn a user of the electronic device of the geographic presence of the restricted device.

According to one embodiment of the electronic device, the control circuit is further configured to determine if the restricted data is in use and, if so, discontinue use of the restricted data.

According to one embodiment of the electronic device, the electronic device is a mobile telephone that includes call circuitry that establishes a call over a communications network.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
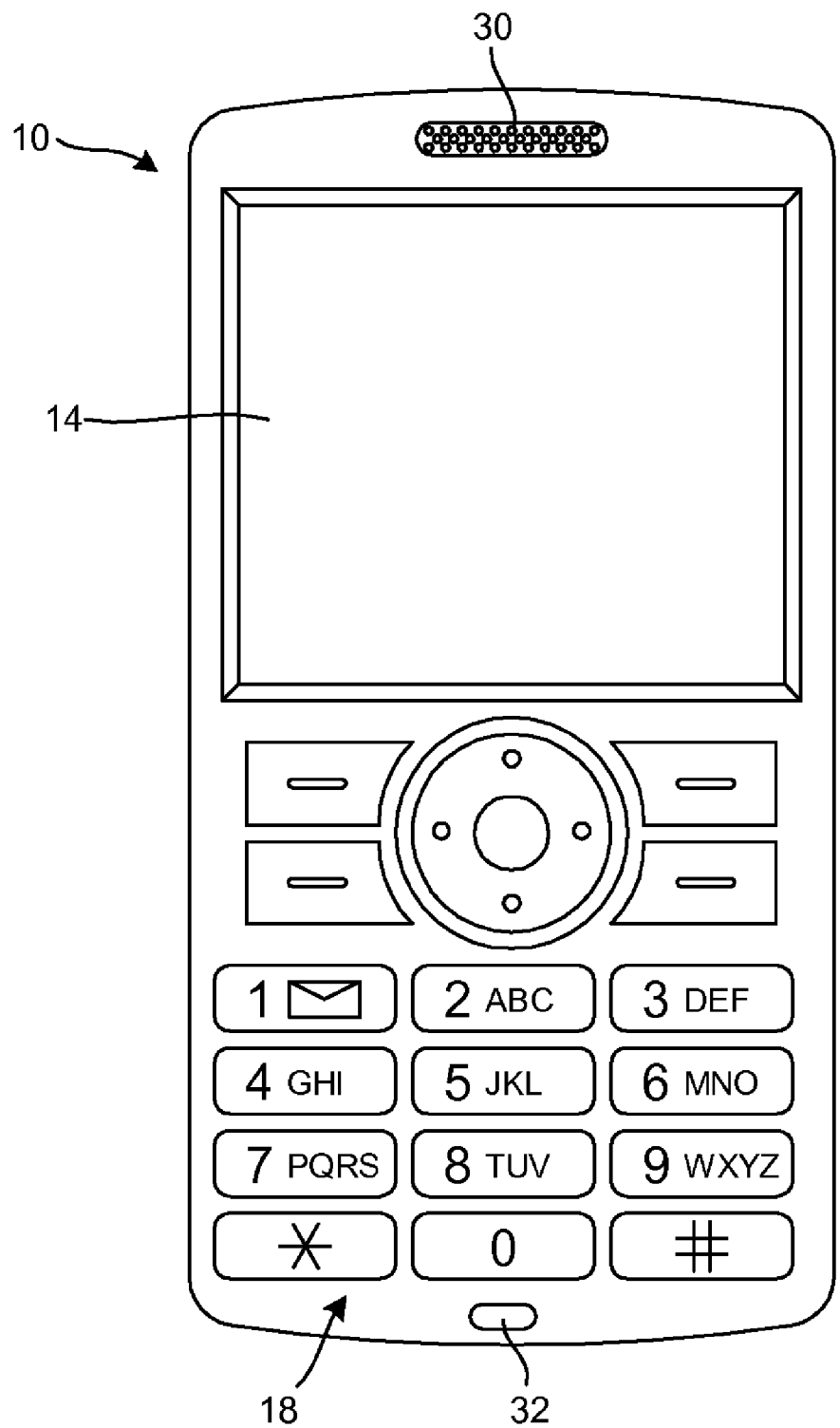
FIG. 1 is a schematic view of a mobile telephone as an exemplary electronic device in accordance with an embodiment of the present invention.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smartphones, portable communication apparatus or the like.

In the present application, embodiments of the invention are described primarily in the context of a mobile telephone. However, it will be appreciated that the invention is not intended to be limited to the context of a mobile telephone and may relate to any type of appropriate electronic equipment, examples of which include a media player, a gaming device and a computer.

Figure 2:
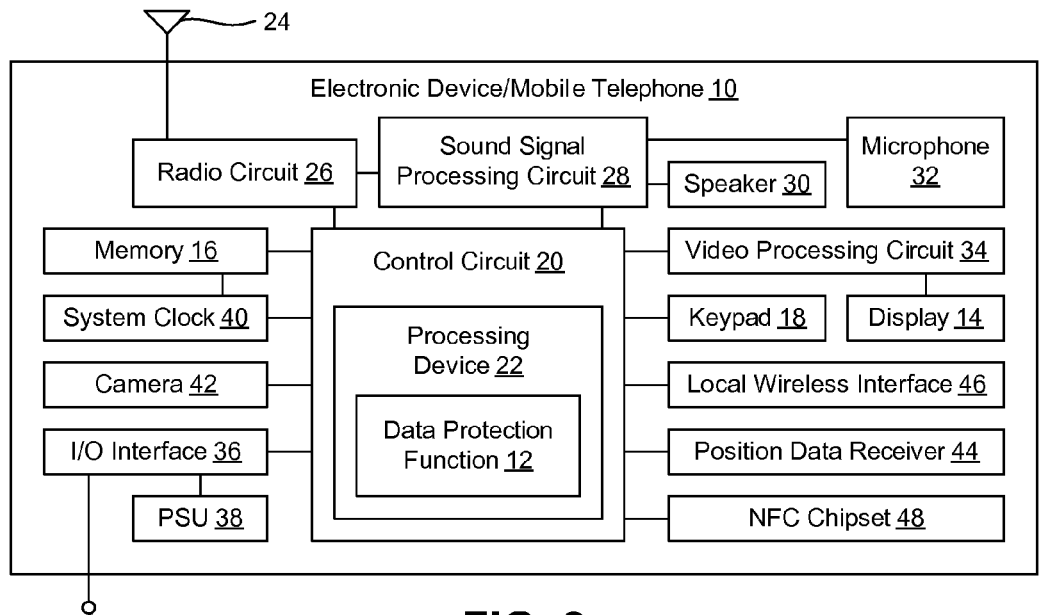
FIG. 2 is a schematic block diagram of the relevant portions of the mobile telephone of FIG. 1.

Referring initially to FIGS. 1 and 2, an electronic device 10 is shown. The electronic device 10 includes a data protection function 12 that is configured to restrict access to user-specified data by restricted devices. Additional details and operation of the data protection function 12 will be described in greater detail below. The data protection function 12 may be embodied as executable code that is resident in and executed by the electronic device 10. In one embodiment, the data protection function 12 may be a program stored on a computer or machine readable medium. The data protection function 12 may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 (FIG. 2) of the mobile telephone 10. The display 14 may be used to present images, video and other graphics to the user, such as photographs, mobile television content and video associated with games.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 14. Also, the display 14 and keypad 18 may be used in conjunction with one another to implement soft key functionality.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds) and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging text messages. Processing such data may include storing the data in the memory 16, executing applications to allow user interaction with the data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10. Among other tasks, the control circuit 20 may carry out timing functions, such as timing the durations of calls, generating the content of time and date stamps, and so forth. The memory 16 may be, for example, one or more of a buffer, a flash memory, a hard drive, a removable media, a volatile memory, a non-volatile memory, a random access memory (RAM), or other suitable device. In a typical arrangement, the memory 16 may include a non-volatile memory (e.g., a NAND or NOR architecture flash memory) for long term data storage and a volatile memory that functions a system memory for the control circuit 20. The volatile memory may be a RAM implemented with synchronous dynamic random access memory (SDRAM). The memory 16 may exchange data with the control circuit 20 over a data bus. Accompanying control lines and an address bus between the memory 16 and the control circuit 20 also may be present.

The processing device 22 may execute code that implements the data protection function 12. It will be apparent to a person having ordinary skill in the art of computer programming, and specifically in application programming for mobile telephones or other electronic devices, how to program a mobile telephone 10 to operate and carry out logical functions associated with the data protection function 12. Accordingly, details as to specific programming code have been left out for the sake of brevity. Also, while the data protection function 12 is executed by the processing device 22 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20 and the memory 16.

The mobile telephone 10 may include a camera 42 for taking digital pictures and/or movies. Image and/or video files corresponding to the pictures and/or movies may be stored in the memory 16.

The mobile telephone 10 also may include a position data receiver 44, such as a global positioning system (GPS) receiver, Galileo satellite system receiver or the like. The position data receiver 44 may be involved in determining the location of the mobile telephone 10.

The mobile telephone 10 also may include a local wireless interface 46, such as an infrared transceiver and/or an RF interface (e.g., a Bluetooth interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

The mobile telephone 10 also may include a near field communication (NFC) chipset 48 or comparable communication component (e.g., localized communicator) to establish a localized communication link with a compatible component of another device when the devices are brought in relatively close proximity to each other. The term NFC is generally used to refer to a magnetic field induction communication interface and protocol that was jointly developed by Sony and Phillips and which has been adopted as standards by ECMA (ECMA-340) and ISO/IEC (ISO/IEC 18092). NFC generally has a working distance of about zero centimeters to about twenty centimeters, or more. NFC may be used in a passive communication mode where an initiator device provides a carrier field and that is answered by modulating the existing field with a transponder, which may draw operating power from the initiator-provided electro-magnetic field. NFC also may be used in an active communication mode where both the initiator and transponder communicate by generating their own fields, in which case both the initiator and the transponder typically receive power from a power supply. NFC may be used to configure and initiate another wireless network connection between devices, such as Bluetooth and WiFi connections. As will be appreciated, the illustration and description of an NFC chipset 48 is meant to be an example of a close proximity communication device and any appropriate device (e.g., localized communicator) to establish a localized communication link may be used and may include devices that rely on a capacitive coupling technique, a propagating wave (e.g., electromagnetic) technique, a radio frequency transmission technique (e.g., such as the techniques used for RF identification (RFID) devices), a magnetic field induction technique or any other appropriate technique. The localized communication link may have an operating range that exceeds twenty centimeters, and may function to tens of meter or beyond, especially when communication via an RFID technique is used.

Figure 3:
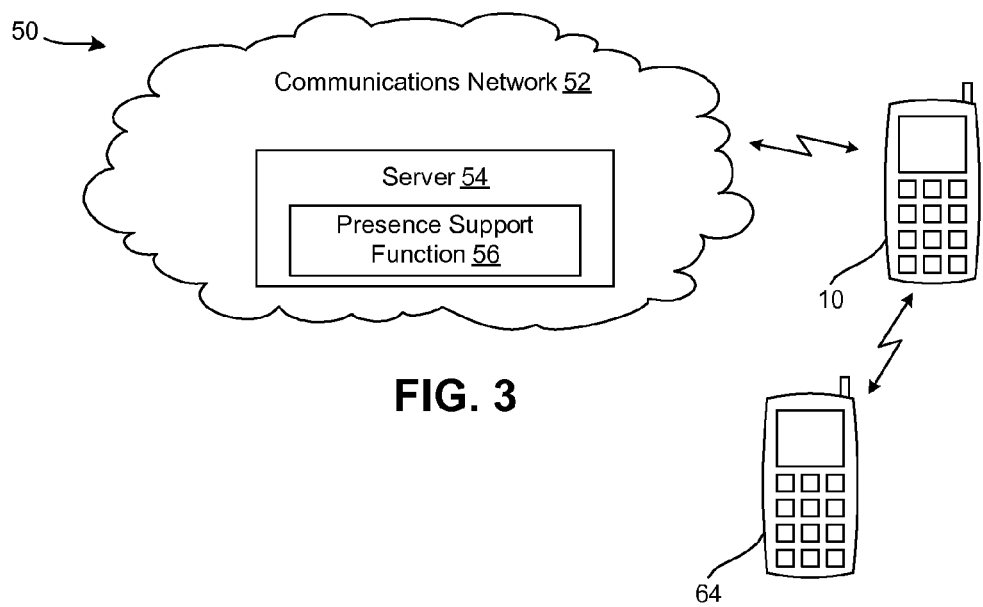
FIG. 3 is a schematic diagram of a communications system in which the mobile telephone of FIG. 1 may operate.

With additional reference to FIG. 3, the mobile telephone 10 may be configured to operate as part of a communications system 50. The communications system 50 may include a communications network 52 having a server 54 (or servers) for managing calls placed by and destined to the mobile telephone 10, transmitting data to the mobile telephone 10 and carrying out any other support functions. The server 54 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 52 may support the communications activity of multiple mobile telephones 10 and other types of end user devices. As will be appreciated, the server 54 may be configured as a typical computer system used to carry out server functions and may include a processor configured to execute software containing logical instructions that embody the functions of the server 54 and a memory to store such software.

In one embodiment, the server 54 may be configured to store and execute a presence support function 56 that interacts with the data protection function 12 of the mobile telephone 10. Details of the presence support function 56 will be described below in greater detail. In one embodiment, the presence support function 56 may be a program stored on a computer or machine readable medium. The presence support function 56 may be a stand-alone software application or may form a part of a software application that carries out additional tasks related to the functions of the server 54. In one embodiment, the functions of the presence support function 56 may be distributed among multiple servers, including one or more servers located outside the domain of the communications network 52

Figure 4:
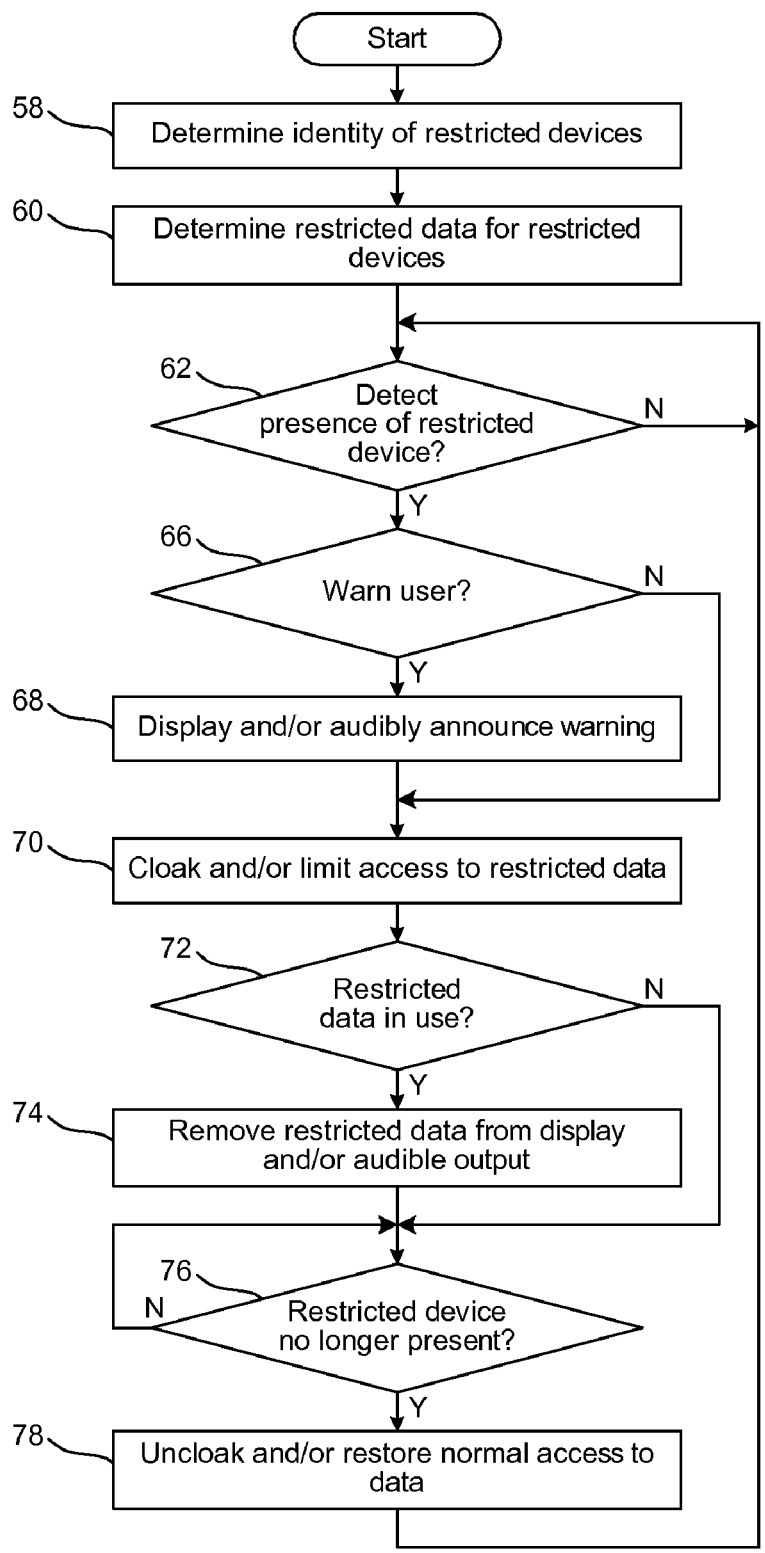
FIG. 4 is a flow chart representing an exemplary method of protecting data based on geographic presence of a restricted device.

With additional reference to FIG. 4, illustrated are logical operations to implement an exemplary method of protecting data based on geographic presence of another device. The exemplary method may be carried out by executing an embodiment of the data protection function 12, for example. Thus, the flow chart of FIG. 4 may be thought of as depicting steps of a method carried out by the mobile telephone 10. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for the data protection function 12 may begin in block 58 where the identity of one or more restricted devices is determined. A restricted device may be any electronic device whose location relative to the mobile telephone 10 (or other electronic device having the data protection function 12) may be determined. It is noted that, in most cases, at least one of the restricted device or the electronic device having the data protection function 12 is a portable electronic device. In some cases, either the restricted device or the electronic device having the data protection function 12 may be a stationary electronic device. Exemplary stationary electronic devices include, but are not limited, desktop computers, televisions, home audiovisual systems, and so forth.

In one embodiment, the identity of the restricted device is specified by the user of the mobile telephone 10. The identity may be a unique device identifier associated with the device or a device name established by an owner of the device. It is contemplated that the user of the mobile telephone 10 may be concerned that a person associated with the restricted device may gain access to data stored by or playable by the mobile telephone 10. As will become more apparent through the following descriptions, the method may provide a way to reduce the ability of the person associated with the restricted device from accessing, seeing and/or hearing restricted content. The method may have application in a number of settings. In one example, the user of the mobile telephone 10 may want to protect sensitive information from certain coworkers, family members, friends, a certain category of persons, persons deemed by the user to be untrustworthy and so forth. By use of the method, sensitive corporate or personal material may be protected. Also, the user may protect adult or mature materials from minors or others with whom the user does not wish to share this data. The restricted devices may include stationary devices so that when the user approaches the device, appropriate restrictions are imposed. This may be useful when the user is at his or workplace to protect data from coworkers, visitors, vendors and so forth. In another example, the stationary device may be at the user's home so as to protect data from family members or visitors. As indicated, the restricted devices may include mobile devices so that when the restricted device and the mobile telephone 10 become sufficiently close to one another, the data may be protected from access, viewing or listening by the user of the portable restricted device.

In one embodiment, a list or database of restricted devices may be maintained by the mobile telephone 10. Similar to the manner in which the mobile telephone 10 may maintain a list of "buddies" in a "buddy list," the restricted devices may be considered "un-buddies" and maintained in an "un-buddy list." Buddies may be associated with certain preferences, such as an identification of when each buddy is available for communication, available for instant messaging, or is located in geographical presence with the mobile telephone 10. Similarly, the availability and/or geographical presence of restricted devices (or "un-buddies") may be maintained as described in greater detail below. The restricted devices may be placed in groups or may be placed in categories. For instance, electronic devices associated with family members may be placed in a "family" group, electronic devices associated with coworkers may be paced in a "coworker" group, and electronic devices of a certain type (e.g., mobile telephones, wireless network access points, unidentifiable devices, etc.) may be placed in respective categories regardless of an associated user. If a known electronic device meets the criteria for a group or a category, but the user of the mobile telephone 10 does not want to classify that electronic device as a restricted device, an exception for such a known electronic device may be made.

Following block 58, the logical flow may proceed to block 60 where restricted data may be identified. Restricted data may include, but is not limited to, stored information, files, folders, databases, directories, lists (e.g., buddy lists, playlists, contact lists, etc.), contact list entries and the corresponding content contained in the files, databases and the like. Restricted data may be separately identified for each restricted device, each group of restricted devices, and/or each category of restricted devices. Thus, the restricted data for one restricted device may differ from the restricted data for another device. The restricted content may be identified by specific files so that individual files may be tagged as restricted. Also, specific folders or directories may be identified as restricted. Also, the restricted data may be identified by file or data type, such as image files, music files, video files, ringtones, word processing files, spreadsheet files, presentation files, and so forth. Other information may be restricted. For instance, playlists, buddy lists, un-buddy lists (or restricted device lists), contact lists and/or individual contact list entries, directory listings, and so forth may be identified as being restricted for a restricted device, restricted group of devices or restricted category of devices.

The restricted devices and associated restricted data may be maintained in a map or other database structure. In this manner, when geographic presence of a restricted device is identified, as described below in greater detail, the data that is to be protected may be determined. Also, how to protect the restricted data associated with the restricted device may be specified by the user. For instance, the presence of the data may be hidden or cloaked. Cloaking the data may make it appear to the restricted device that the data does not exist in the mobile telephone 10. The directory listings and other file structures may be modified to hide the restricted data from access by the restricted device. Also, the directory listings and other file structures may be modified to hide the restricted data from access by the mobile telephone 10 itself. This may reduce the chance that the user of the mobile telephone 10 may access the restricted data in the presence of a person associated with the restricted device. It may also reduce the chance that the person associated with the restricted device may use the mobile telephone 10 to access the data.

The restricted data also may be protected by discontinuing the ability to access, play or view the data in the presence of the restricted device. Also, the ability to manipulate, open, copy or delete the content may be discontinued in the presence of the associated device. Thus, whether or not the data is cloaked, the use of and/or access to the data may be minimized.

Proceeding to block 62, a determination may be made as to whether a restricted device is geographically present with the mobile telephone 10. FIG. 3 schematically illustrates the geographic presence of a restricted device 64 with respect to the mobile telephone 10. In the example of FIG. 3, the restricted device 64 is another mobile telephone. But, as indicated above, the restricted device 64 may be another type of electronic device.

The presence detection may be configured to determine if a restricted electronic device (e.g., the restricted device 64) is physically near the mobile telephone 10. Various methods of presence detection may be employed. For example, near field communication using a radio frequency (RF) transponder or reader (e.g., the NFC chipset 48) may be used to detect other electronic devices that are within the communication range of the localized communicator and to receive a unique identifying value from each nearby electronic device. If a received identifying value matches a previously identified value for a restricted device, a determination may be made that the corresponding restricted device is nearby. Other wireless interfaces, such as infrared, Bluetooth or WiFi, may be used in a similar manner to detect the presence and/or identity of electronic devices. In this manner, a unique identity of a mobile telephone, a television set, a computer, a network access point (e.g., as represented by a service set identifier (SSID) of a WiFi access point) or other device may be communicated over a corresponding communication link.

In other embodiments, the communications network 52 may host a service to inform the mobile telephone 10 of the relative proximity of one or more restricted devices. For instance, the presence support function 56 may compare the relative location of the mobile telephone 10 and restricted devices. In the case of a stationary restricted device, the location of the stationary restricted device may be provided to the presence support function 56. When the mobile telephone 10 comes within a specified distance of the location of the stationary restricted device, the server 54 may transmit an appropriate signal or message to the mobile telephone 10. In the case of a stationary electronic device that has the data protection function 12, the location of the electronic device may be provided to the presence support function 56. When a restricted device 10 comes within a specified distance of the location of the stationary electronic device, the server 54 may transmit an appropriate signal or message to the electronic device. In the case of a portable restricted device and the portable mobile telephone 10, the location of both the mobile telephone 10 and each restricted device may be monitored and compared against each other. When a restricted device and the mobile telephone 10 are within a specified distance of each other (e.g., twenty feet, one hundred feet, one hundred meters, or other user specified distance), the server 54 may transmit an appropriate signal or message to the electronic device 10. It will be appreciated that all or part of the functions carried out by the presence support function 56 may be carried out by the mobile telephone 10.

The current location of portable electronic devices, such as the mobile telephone 10 and/or the restricted devices, may be determined using any appropriate positioning technology.

For instance, the location determination mechanism may include accessing an identity of a communications access point (e.g., communications tower, network access point, etc.) servicing the device. In one embodiment, the communications tower may be part of a cellular network (e.g., a "cell" tower) that has an associated identifier (e.g., "cell ID") and the identifier is communicated to the mobile device and/or the server 54 as an identifier of position. Each identifier or cell ID in a particular servicing network may be assumed to be unique and, therefore, may be used to indicate relative proximity to a certain location. In one embodiment, the cell ID and any related radio parameters may be used to generate a coordinate value through a radio network service. For example, under global system mobile communications (GSM) and universal mobile telecommunications system (UMTS) protocols, the position could be estimated through a mobile originated location request (MO-LR) to the network so that the device position could be estimated using the network's knowledge of tower locations and antenna directions.

In other embodiments, location information may be determined by receipt of location data from a dedicated system, such as a global positioning system (GPS), Galileo satellite system or the like. Such data may be received via the position data receiver 44, if present as part of the device. The location data may be processed to derive a location value, such as coordinates expressed using a standard reference system (e.g., the world geodetic system or WGS). Also, assisted-GPS (or A-GPS) may be used to determine the location of the device. A-GPS uses an assistance server, which may be implemented with the server 54. The assistance server processes location related data and accesses a reference network to speed location determination and transfer processing tasks from the device to the assistance server. For instance, the assistance server may perform tasks to make range measurements and calculate position solutions that would otherwise be carried out by the position data receiver 44 or elsewhere in the device.

If no restricted devices are determined to be in the geographic presence of the mobile telephone 10, a negative determination may be made in block 64. If a negative determination is made in block 64, the logical flow may wait until a restricted device is determined to be in the geographic presence of the mobile telephone 10. A positive determination may be made in block 64 if one of the local interfaces (e.g., the NFC chipset or other localized communicator, the local wireless interface 46, etc.) detects a restricted device or establishes an interface with a restricted device. Also, a positive determination may be made if the presence support function 56 determines that a restricted device and the mobile telephone 10 are within a specified distance of each other.

Upon a positive determination in block 64, the logical flow may proceed to block 66. In block 66, a determination may be made as to whether to "warn" the user of the mobile telephone 10 of the presence of the detected restricted device. A warning may take the form of a message that is displayed on the display 14 and/or a message that is audibly output by the speaker 32 or interfaced handsfree device. The determination to warn the user may be based on a user settings specific to each restricted device, each group of restricted devices and/or each category of user devices. If a positive determination is made in block 66, the logical flow may proceed to block 68 where the warning is displayed and/or audibly output. Other warnings may include activating a vibrator of the mobile telephone 10, illuminating a light source such as a light emitting diode (LED), and so forth.

Following block 68 or a negative determination in block 66, the logical flow may proceed to block 70. In block 70, the restricted data associated with the restricted device may be protected in one or more of the manners described in preceding portions of this disclosure, such as by hiding corresponding directory entries and/or disabling access to the data or corresponding content.

Following block 70, the logical flow may proceed to block 72 where a determination is made as to whether the restricted data is in use. Use of the data may depend on the type of data. For instance, if the data corresponds to a song, the use of the data may involve audible playback of the song. As another example, if the data corresponds to an image file (e.g., a photograph), the use of the data may involve display of the corresponding image. If a positive determination is made in block 72, the logical flow may proceed to block 74 where use of the restricted data is terminated, paused, or hidden from view as is appropriate for the type of data and/or as based on user settings.

Following block 74 or a negative determination in block 72, the logical flow may proceed to block 76. In block 76 a determination may be made as to whether the restricted device that was detected in block 64 is no longer in the geographic presence of the mobile telephone 10. A positive determination in block 76 may be made if an interface via the local wireless interface 46, NFC chipset 48 or other interfacing apparatus is lost. In other situations, the presence support function 56 may determine that the mobile telephone 10 and the restricted device are further apart that the predetermined distance that resulted in a positive determination in block 64. If a negative determination is made in block 76, the logical flow may wait until a positive determination is made.

If a positive determination is made in block 76, the logical flow may proceed to block 78 where normal access to the data that was restricted in block 70 may be restored. Following block 78, the logical flow may return to block 64 to wait until a restricted device is determined to be in the geographic presence of the mobile telephone 10.

As will be appreciated, the disclosed methods and systems are directed to limiting the visibility of and/or access to data (e.g., digital content) based on the detection of the geographic presence of a user-specified restricted device that is associated with a certain person or persons. The storage platform of the restricted data may be referred to as a host or "digital home." Content lists, directories and file structures may be manipulated based on the physical proximity or geographic presence of a restricted device with respect to the digital home to protect data stored by the digital home.

In addition to or instead of protecting data based on the geographic presence of a restricted device, the method may be modified to protect data based on the availability of the restricted device. Availability refers to the ability of the restricted device to be in operable communication with the mobile telephone 10. The operable communication may be established through direct wireless communication or wired communication. Also, the operable communication may be established through a local area network and/or a wide area network over which the mobile telephone 10 and the restricted device may communicate, exchange messages (e.g., instant messages), and/or interface with each other.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of protecting data stored by an electronic device, comprising:
   receiving an identifier of a restricted device;
   determining an identity of the restricted device based on said identifier;
   determining restricted data associated with the restricted device, the restricted data being one or more items of data stored by the electronic device;
   identifying a data directory not accessible by said restricted device;
   detecting geographic presence of the restricted device with respect to the electronic device; and
   determining cloaking settings for the restricted data to limit access to the restricted data by the restricted device, wherein the data protection for the restricted data includes disabling an ability to access the restricted data using the restricted device by cloaking the data directory to hide the existence of the restricted data as part of the data stored by the electronic device.

2. The method of claim 1, wherein the detecting of the geographic presence of the restricted device is accomplished by receiving a device identifier from the restricted device over a communication link established directly between the restricted device and the electronic device.

3. The method of claim 1, wherein the detecting of the geographic presence of the restricted device is accomplished by identifying a location of the electronic device, identifying a location of the restricted device and comparing the locations.

4. The method of claim 1, wherein the restricted data is a file, folder, database or directory stored by the electronic device.

5. The method of claim 1, wherein the restricted data is at least one of a buddy list, a playlist or a contact list maintained by the electronic device.

6. The method of claim 1, wherein protecting the restricted data includes disabling an ability to access the restricted data using the electronic device.

7. The method of claim 1, further comprising warning a user of the electronic device of the geographic presence of the restricted device.

8. The method of claim 1, further comprising determining if the restricted data is in use and, if so, discontinuing use of the restricted data.

9. The method of claim 1, wherein the electronic device is a mobile telephone.

10. An electronic device, comprising:
    a memory that stores data, some of the data being specified by a user of the electronic device as restricted data for an associated restricted device; and
    a control circuit that is configured to protect the restricted data by limiting access to the restricted data by the restricted device when the restricted device is detected to be in a geographic presence with respect to the electronic device, wherein the data protection for the restricted data includes determining cloaking settings for the restricted data to limit access to the restricted data by the restricted device by disabling an ability to access the restricted data using the restricted device by cloaking a data directory to hide the existence of the restricted data as part of the data stored by the electronic device.

11. The electronic device of claim 10, further comprising a wireless communication link device for establishing a communication link between the electronic device and one or more other electronic devices, and wherein detection of the geographic presence of the restricted device is accomplished by receiving a device identifier from the restricted device over a communication link established directly between the restricted device and the electronic device using the communication link device.

12. The electronic device of claim 10, wherein detection of the geographic presence of the restricted device is accomplished by identifying a location of the electronic device, identifying a location of the restricted device and comparing the locations.

13. The electronic device of claim 10, wherein the restricted data is protected by disabling an ability to access the restricted data using the electronic device.

14. The electronic device of claim 10, wherein the control circuit controls the electronic device to warn a user of the electronic device of the geographic presence of the restricted device.

15. The electronic device of claim 10, wherein the control circuit is further configured to determine if the restricted data is in use and, if so, discontinue use of the restricted data.

16. The electronic device of claim 10, wherein the electronic device is a mobile telephone that includes call circuitry that establishes a call over a communications network.

17. The electronic device of claim 10, wherein the restricted data is at least one of a file, folder, database or directory stored by the electronic device.

18. The electronic device of claim 10, wherein the restricted data is at least one of a buddy list, a playlist or a contact list maintained by the electronic device.

* * * * *